Figure 1:
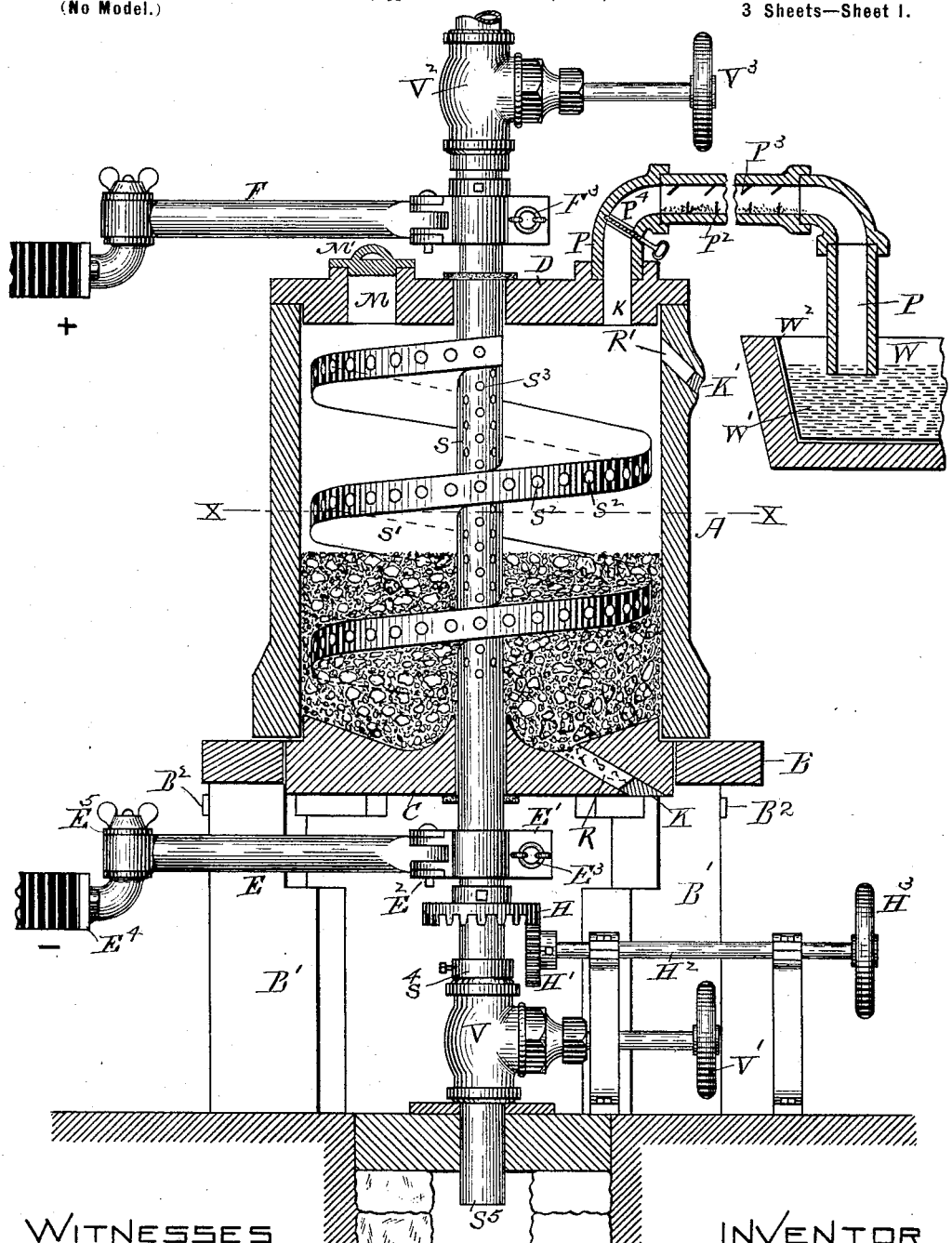

No. 614,927. Patented Nov. 29, 1898.
G. D. BURTON.
PROCESS OF AND APPARATUS FOR SEPARATING METALS AND BY-PRODUCTS FROM ORES BY ELECTRICITY.
(Application filed Jan. 25, 1897.)
(No Model.) 3 Sheets—Sheet 1.

WITNESSES
Frank G. Parker,
Frank G. Hattie

INVENTOR
Geo. D. Burton

No. 614,927. Patented Nov. 29, 1898.
G. D. BURTON.
PROCESS OF AND APPARATUS FOR SEPARATING METALS AND BY-PRODUCTS FROM ORES BY ELECTRICITY.
(Application filed Jan. 25, 1897.)
(No Model.) 3 Sheets—Sheet 2.

WITNESSES
Frank G. Parker
Frank G. Hattie

INVENTOR
Geo. D. Burton

No. 614,927. Patented Nov. 29, 1898.
G. D. BURTON.
PROCESS OF AND APPARATUS FOR SEPARATING METALS AND BY-PRODUCTS FROM ORES BY ELECTRICITY.
(Application filed Jan. 25, 1897.)
(No Model.) 3 Sheets—Sheet 3.

WITNESSES:
Frank G. Parker
Frank G. Hattie

INVENTOR:
Geo. D. Burton

UNITED STATES PATENT OFFICE.

GEORGE D. BURTON, OF BOSTON, MASSACHUSETTS.

PROCESS OF AND APPARATUS FOR SEPARATING METALS AND BY-PRODUCTS FROM ORES BY ELECTRICITY.

SPECIFICATION forming part of Letters Patent No. 614,927, dated November 29, 1898.

Application filed January 25, 1897. Serial No. 620,591. (No model.)

*To all whom it may concern:*

Be it known that I, GEORGE DEXTER BURTON, a citizen of the United States of America, residing at Boston, in the county of Suffolk and Commonwealth of Massachusetts, have invented certain new and useful Improvements in Processes of and Apparatus for Separating Metals and By-Products from Ores by Electricity, of which the following is a specification.

My invention relates to an apparatus for desulfurizing and working metallic ores or substances containing metal, and relates, further, to a process for refining, purifying, or discharging impurities from minerals and metallic ores, and also to the extraction from those ores of other substances contained in them—such as sulfur, arsenic, antimony, &c.—in a liquid or semiliquid form, and by means of which the metals that are left in the ores will be left in a state approximately pure.

It also relates to the treatment of ores known as "sulfids" and "oxids."

My improvements relate, further, to the electrical apparatus employed and found best adapted to the successful treatment of the class of ores herein described, also to the method of constructing the furnace, the construction of the conductors of electricity used within the furnace and capable of conducting a current of electricity of large volume and low pressure within the furnace, making it possible to treat a large body of ore at one time with the electrical furnace, and regulating the temperature in the furnace to a predetermined degree during any of the various steps involved in the operations set forth, and relates, further, to the method of treating ores so as to expel the moisture in the ore, thereby preventing the possibility of expansion, cracking, or breaking of the furnace.

My invention relates particularly to placing a conductor or conductors of electricity in an ore-working furnace and heating said ores by a current of electricity to a predetermined heat and regulating the temperature of the heat in the furnace and ores to the required degree to complete a successful ore-working operation.

Another essential feature is the use of the coil, as shown in Figure 1, and holes disposed in the coil, or in the main body and coil, or within the coil and not the main body of the pipe, or vice versa, causing the moisture in the ore to be quickly expelled by the heat created by the current. There is also less liability from expansion of the ore in the furnace, preventing cracking or breaking of the body of the furnace. The coil furnishing an even heat within the furnace prevents matting or setting of the ore, and by rotating the perforated conductor by hand or power the possibility of the ore setting in the furnace is practically eliminated.

Figure 2:
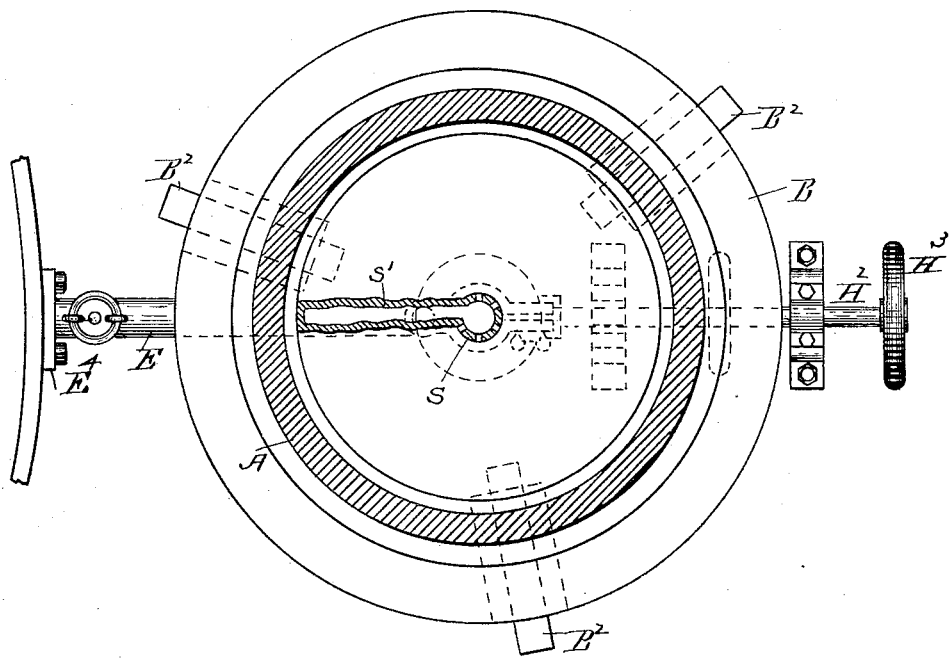
Figure 3:
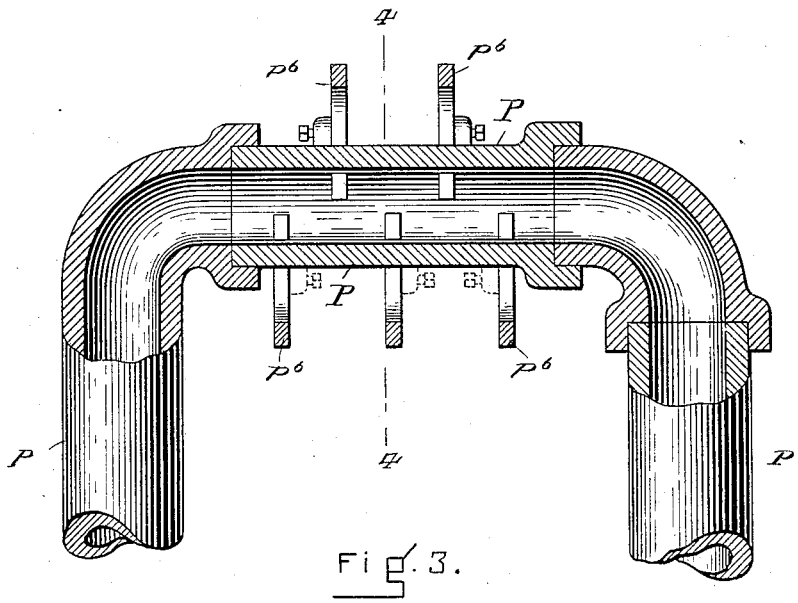
Figure 4:
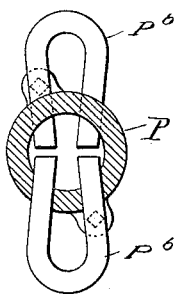

Fig. 1 represents a view, partly in vertical section and partly in elevation, of an apparatus embodying this invention. Fig. 2 represents a horizontal section on line $x\ x$ of Fig. 1. Fig. 3 represents, partly in section and partly in elevation, one form of pipe for connecting the furnace and the collecting-tank for the by-products, said pipe being provided with magnets for taking out magnetic particles from the fumes. Fig. 4 represents a transverse section of said pipe on line 4 4 of Fig. 3.

The same reference-letters indicate the same parts in all the figures.

In the drawings, A represents the cylinder, which forms the body of my furnace, which can be made of any suitable non-conducting material. This cylinder stands upon a base-piece B, which in turn is supported by three piers B' B' B'. The bottom C of the furnace is shaped as shown in Fig. 1 and is held in place by sliding blocks $B^2\ B^2$. By withdrawing the blocks the bottom C of the furnace can be lowered, so as to remove the contents. An opening R is made in the bottom piece for convenience in withdrawing the molten result of the treatment. An orifice R' is left near the top of the furnace for the escape of gases, &c.

For the purpose of saving any of the products contained in the ores that may be forced off by the heat from the furnace I use a pipe P P. This pipe is made in sections, so as to be readily taken apart when it is desired to remove any product that may have condensed or otherwise formed within it.

$P^2\ P^3$ represent series of deflectors placed within the pipe for the purpose of checking the free flow of gases and floating matter and causing the latter to be deposited within the pipe. A tank W of watery liquid receives the end of the pipe P P and serves to condense and collect any residual that may have remained in the vapor that passes through the pipe. Suitable valves, &c., for governing the flow through the pipe may be used. A suitable valve P⁴ is disposed in the pipe P P and may be closed when the moist gases are being expelled from the furnace and opened when it is desired to save sulfur and other by-products contained in the ores.

For the purpose of electrically heating and agitating the contents of the furnace I have the following-described devices: A hollow shaft S, preferably composed of an alloy of metal consisting of three parts copper, two parts antimony, and one part tin, extends from the valve V upward through the center of the furnace to the valve V². A collar S⁴ holds the shaft up and allows it to turn freely and practically air and gas tight on the upper end of the valve V. The shaft S is turned, when desired, by the wheel H³, acting through its shaft H² and the gears H' and H. A pipe S⁵ leads to the valve V and through it to the hollow shaft S. The object of the pipe S⁵ is to allow of the admission of air or gas to the furnace through the openings S² S³. A hand-wheel V' controls the valve V, and a similar wheel V³ controls the valve V². The hollow shaft S is provided with a spiral hollow flange S'. (See Fig. 1.) The interior of this spiral flange S' is connected to the interior of the shaft S, so that gas or air may be introduced to it through the pipe S⁵.

For the purpose of electrically heating the shaft S and its flange S', I have two outside electric conductors E and F. These conductors are made alike, one being connected to the positive source of electricity and the other to the negative source, and I will describe the lower one only. The bracket-piece E⁴ connects to the negative pole of electrical source. Upon this bracket-piece the electrode E swings and is made to fit accurately and held in close contact by the screw E⁵. To insure a good electrical contact between the conductor E and the hollow shaft S, I have hinged by the pin E² to the conductor-bar E a clamping-piece E', which is held by the screw E³. The positive conductor F is made and connected in the same manner as the negative conductor E above described.

The electrical apparatus best adapted to the treatment of ores by my process is a machine producing an alternating current of sixteen hundred to eighteen hundred volts and twenty-four amperes, which when transformed gives a current of from four to sixteen volts and from six thousand to seven thousand amperes. Such apparatus is used by me in my factory at Boston, Massachusetts, and described in the following patents of the United States, to wit: No. 475,232, to G. D. Burton, A. H. Eddy, and G. T. Briggs, dated May 17, 1892; No. 486,625, to G. D. Burton, dated November 22, 1892, and No. 475,184, to G. D. Burton, dated May 17, 1892, and it is not deemed essential to further describe or show the electrical apparatus employed in connection with that described in this specification. I desire, however, to refer particularly to the fifth claim of Patent No. 475,232, which relates especially to the method of manipulating the current so as to regulate and maintain the due proportion of amperage to voltage in the alternating current during the heating process by variations produced at will, &c., whereby the temperature of the material between the electrodes may be first raised to a predetermined working heat at one or more points and successively raised in all other parts to the desired working heat which is essential and necessary in order to treat the ore properly, economically, and successfully. Without the application of the essential feature of a minute regulation of the heat I have found it impracticable and impossible to treat a body of ore in the manner shown and described.

Sulfur, arsenic, antimony, and other rebellious substances exist in many ores and earths. By my process I place the refractory ores or substance containing combustible matter—such as ores containing, in part, sulfur, antimony, arsenic, zinc, lead, &c.—in a partly-closed receptacle or furnace constructed of some non-conducting material, such as fire-clay, especially prepared, so as not to absorb the metallic particles exuding from the ore, and I prevent the absorption by glazing the exterior and interior surfaces of the said receptacle with a glazing substance composed of a mixture in the proportion of five pounds of clay, two pounds of chlorid of sodium, one pound of borax, and one pound of glass, ground very fine, mixed and subjected to heat until it becomes a thick liquid. The glazing is applied after the crucible or that part of the furnace is formed or shaped, and then treated in a heating-furnace to set the glazing, which will withstand a very high heat when treated in this way. The advantage in the use of a receptacle constructed in this manner is that it is a non-conductor of the current, will not absorb the metal, nor cause the metallic particles to adhere to the walls of the said receptacle. The glazing strengthens the receptacle and renders the furnace less liable to crack or break. This furnace is provided with top and bottom coverings made of the same material and in the same manner. These top and bottom plates are fitted closely to the body of the furnace.

In the treatment of such ores as arsenical ores, lead ores, or ores containing sulfur, arsenic, and other rebellious substances I mix coke, carbon-dust, lime, &c., in such proportions as the nature of the ore requires and then place them in the furnace. Means are employed, as shown, to rotate the coil or other device in the furnace and stir up or turn the ore when necessary. When the current is applied to the pipe, &c., all of that part between the outside conductors is brought to the proper degree of heat, which heats the ore, and all of the obnoxious gases are eliminated from the furnace through the holes $S^2$ $S^2$ in the pipe and are conducted through the pipe S and valve $V^2$ outside of the furnace. In some ores, such as lead or galena-silver ore, the arsenic or sulfur fumes are forced off through the opening $P'$ and pipe P P at the top of the furnace and are deposited in the shape of flour of sulfur or metallic arsenic. The metallic lead in the lower part of the furnace may be drawn off by tapping the spout K at the bottom. The condition of the ore left in the furnace varies according to the character and nature of the formation of the ores under treatment—such, for instance, as ore containing sulfur and iron. In this case we would have a desulfurized gangue, which is removed and reduced by another operation. By placing these ores in a furnace or retort, as described, and subjecting them while in the furnace to the action of heat created by electricity, as described herein, all of the impurities are eliminated either in a gaseous form or are driven off in a semiliquid form. The degree of heat which I obtain by the use of this apparatus I am unable to state, owing to my inability to find a pyrometer capable of measuring the heat obtained.

The regulation of the current so as to produce just the degree of heat required and the manipulation of the current so as to quickly change the character of the current and the degree of the heat are of great importance in the successful treatment of ores, all of which is accomplished by the apparatus shown and described. I have found that I require a current of comparatively small pressure and large volume. With a current of large volume and low pressure I very quickly obtain a high and even degree of heat. The volume or intensity of the current must be varied according to the character and quantity of the ore under treatment. An alternating or interrupted current such as I use is best adapted, because it agitates the particles of metal in the ores and causes them to vibrate rapidly within the ore, and where the particles are in close proximity to one another they cause a more rapid heating effect of the ore.

By using a minutely-regulated current I am enabled to heat the pipe, flange, or coil in the center of the furnace to any degree of heat required and control the heat in said pipe or coil to a predetermined temperature for a long time. By so doing I am able to heat the mass of ore slowly or quickly, as the nature of the ore requires. By making the conductor substantially as shown in Fig. 1 I obtain an even heat throughout the entire mass in the furnace, which is essential in the successful treatment of that class of ores known in mining as "rebellious" or "refractory" ores. Electrodes made of copper instead of carbon or iron are preferable in the smelting of some kinds of ore, such as lead-galena. It prevents adhesion of the metallic lead to the electrodes if a flux composed of chlorid of sodium and carbon-dust is used and mixed with the ore when placed in the furnace.

The ends of the pipe protruding through the top and bottom plates or covers of the furnace are always in view of the operator, who can determine the heat in the conductors within the furnace, as the outside will be at a slightly-lower temperature than that part of the conductors inside of the furnace. The atmosphere acting only on that part of the pipe between the conductors protruding through the furnace at each end causes it to be of a lower heat than that portion inside the furnace excluded from the atmosphere. The cross-section of the pipe in the center of the coil and connected at one end with the positive pole and at the other with the negative pole of electricity must be in proportion to the cross-section of the metal in the coil, so as to give an even heat in all parts of the coil or pipe; otherwise some parts of the coil are liable to become overheated, which would damage the coil. The conductors connected to the coil or pipe at each end outside the furnace are composed of bars of copper capable of carrying a current varying from eight thousand to twelve thousand amperes and from eight to fifty volts, which is varied as desired. These copper bars are three inches in diameter. The quantity of ore which can be treated at one time in this furnace varies according to the nature and quality of the ore. Iron ore containing sulfur and other substances where sulfur predominates, from three hundred to five hundred pounds can be successfully handled in this furnace, the ore being crushed into pieces of about the size of chestnuts.

A number of furnaces can be operated by the same dynamo, separately, consecutively, or together.

A furnace constructed in the manner herein described is useful in the manufacture of carbid of calcium, and in that case the resistance-rod may be constructed of carbon.

Refractory or rebellious ores containing gold, silver, copper, &c., are successfully treated by this process. In most cases it is necessary to mix a flux with the ore—such as chlorid of sodium or bicarbonate of soda, &c.—which causes the metal to be more readily expelled from the ores.

In that part of the pipe extending below the bottom of the furnace I have placed a valve or plug V, which can be opened or closed at will of the attendant to admit or exclude air or oxygen from the furnace when necessary or desired. In the smelting of such ores as contain iron, sulfur, arsenic, lead, zinc, &c., before placing this class of ores in the furnace it is better to close the valve, and when the current is applied to the pipe or electrodes and the substance becomes sufficiently heated to cause the material in the furnace to pass off sulfurous or arsenical fumes or lead or zinc oxids this temperature is maintained until the ores or substances are freed from such as will pass off. I then increase the heat in the furnace to the next required degree (by increasing the volume of the current) and open the valve V in the pipe, thus admitting as much or as little air or oxygen into the furnace as is necessary to expel the carbon and such other impurities as remain in the ore. By the admission of air into the furnace in this way the heat is rapidly radiated and distributed through the remaining substance in the furnace and it is quickly heated to the desired point. I regard this as an important discovery in the treatment of such ores as are known as "rebellious" or "refractory" ores and in the treatment of metal or ore where it is desired to expel the carbon from the metal. By admitting air into the heated pipe at the bottom and through the coil in the furnace it greatly increases the penetrating properties of the heat throughout whatever substance remains in the furnace. A pipe, flange, or electrodes, as heretofore described, made of copper and antimony best serves this purpose, as it withstands a high degree of heat and is also a good conductor of heat. In a pipe two inches in diameter I would recommend an opening of only one-half of an inch through the center and coil of the pipe, as with a small opening the walls of the pipe will be of greater thickness, thereby furnishing more heat-conducting surface.

In this specification I have mentioned various kinds of flux necessary to be combined with some ores to aid the smelting process. I do not wish to be understood as confining myself to the use of the particular fluxes mentioned for all ores carrying the same metals, as I have found by treating over a thousand ores from probably as many mines that there is a great difference in the chemical properties of rebellious or refractory ores and that it is necessary to flux such ores as their nature and chemical properties require in order to obtain the best results.

Referring to the fumes forced off from the ores or substance—such as sulfur, lead, or zinc oxid, &c.—these metallic fumes rise in the furnace when forced from the ores by heat and pass off through the opening P' at the top of the furnace and are conducted by the pipe P P into a vessel containing a watery liquid. In passing through the pipe some of the fumes are obstructed by the projections placed in the pipe, as shown, and the metallic particles will fall against these projections and form a deposit in the pipe in the form of lead or zinc oxids. In case of the sulfurous fumes (which are lighter than the zinc or lead) these fumes are carried farther along before they are precipitated to the bottom part of the pipe. A deposit of flour of sulfur is then found. Such particles of sulfur as do not fall are conducted into the tank containing the watery liquid.

By my method of heating a body of ore by electricity in an ore-working furnace I am enabled to produce a governable heat throughout the entire mass of ore without the use of a fan or blower, as the action of the current is sufficient to force off the gases, fumes, impurities, &c. I am also able to produce a heat without imparting to the ore under treatment any foreign gases or detrimental impurities. The apparatus forms a clean, complete, economical, and successful ore-working furnace, rapid in its operation, and easily cared for, all of which has been determined after a long series of experiments.

To obtain the required heat within the furnace, the electric conductor may be made in two parts, as shown in Fig. 3, and each end of these conductors can be connected to opposite poles of the source of electricity and joined in the furnace by the ore. I speak of this as a modification in the construction of the furnace, and I wish to reserve the right to all equivalent modifications which effect the broad principles herein shown and described.

In the fume-conducting pipe P P or conductor at the top of the furnace I may place a series of electromagnets or a series of horseshoe-magnets, which may be inserted into the pipe P P at any suitable point through suitable openings in said pipe P P, said openings arranged so as to be opened and closed for the insertion of the magnets and closed after the magnets have been withdrawn, so that the pipe shall be still tight, said magnets being for the purpose of attracting the metallic particles as they pass off from such ores as contain metals of a magnetic nature, thereby causing a separation of the magnetic particles of metal from the non-magnetic at such point or points in the pipe P P as seems best adapted to the ore under treatment.

The pipe P P, leading from the top of the furnace for conducting the fumes and serving as a depository for such substances as are emitted from the ores, as sulfur, metallic oxids, and arsenic, is supplied with projections $P^2$ $P^3$ to obstruct the particles of sulfur, arsenic, &c., and cause them to fall and be deposited in the pipe P P. The lighter fumes are passed on through the pipe and are conducted into the tank W of watery liquid W'. The tank W is constructed of wood or other material, in which is placed a second tank or receptacle $W^2$, composed of zinc, lead, or copper. If we were to convert the sulfurous fumes into sulfuric acid, the second tank or lining should be composed of lead to prevent action of the acid and the destruction of the tank. The pipe P P is preferably made in sections, so it can be readily taken apart at such points as required to cause the separation of the flour of sulfur from the other substances and for the purpose of quickly separating one substance deposited from another. After the pipe has been taken apart each substance may be removed to a separate receptacle and the pipe P P replaced and the operation continued. As I have heretofore referred, where the particles that are forced off from the ores are of a magnetic nature I place in the pipe P P, either with or without the projections $P^2$ $P^3$, a series of magnets $P^6$ to obstruct such magnetic particles and cause their separation from other by-products of a non-magnetic nature forced off from the ores. These particles can be removed from the pipe P P by taking it apart and removing them in the manner hereinbefore described. In such ores as do not contain magnetic particles it is not necessary to place the magnets in the pipe. In the treatment by my process of such ore as contains nickel, iron, and sulfur unless the magnets $P^6$ are placed in the pipe P P to obstruct the particles of iron such particles will become mixed with the flour of sulfur extracted from the ore.

In the openings R R', I place wet clay K K', which quickly sets under heat and closes the openings to the furnace. When it is desired to open the orifices R R', the clay is removed by forcing a pointed iron into the openings R R' from outside the furnace, thus removing the clay stopper. The furnace may be opened and closed at will in this manner.

Where I use the word "ore" in this specification, I desire to be understood as applying it to substances in any form which contain metallic particles adapted for treatment herein.

In the practice of the process by the apparatus herein illustrated the rebellious or other ore is placed in the furnace A. Sometimes a little charcoal or other combustible material is added to the ore, and sometimes a little common salt, or chlorate of potash, or borax, or other flux is mixed with the ore. The furnace is closed, including the valves V, $V^2$, and $P^4$. The electric current is then turned on and passes through the electrode S S' and through the mass of ore. The electrode and the ore allow the current to pass, but offer sufficient resistance to develop the necessary heat in the mass of ore. As soon as the ore becomes sufficiently heated to eliminate the moisture contained therein the valve $V^2$ is opened and the moist vapors escape through the hollow rod S. When the moist vapors have passed off, the valve $V^2$ is closed and the valve $P^4$ is opened. The volume of the current is then increased and the ore subjected to a roasting heat, the sulfur and other by-products then passing off in the shape of fumes. These fumes are conducted through the pipe P into the tank W of watery liquid, and the sulfur may be converted into sulfuric acid. When the fumes containing the by-products have been forced off from the ore under treatment, the valve $P^4$ is closed and the valve V is opened and air or oxygen is admitted to the furnace for a few seconds or minutes, and this air or oxygen unites with any sulfur or combustible matter that may remain in the ore and creates combustion. The valve $V^2$ is then also opened for a few seconds or minutes. When the roasting operation is completed, both valves V and $V^2$ are closed and the volume of electric current increased, so that the heat in the mass of ore is raised to a reducing temperature for the metal having the lowest fusing-point. Such metal on becoming fused may be drawn off through the spout K. If necessary at this stage, additional flux may be added to the mass of ore and the heat still further increased by increasing the volume of the electric current. If the ore contains two or more metals, when one of the metals has been eliminated the volume of the electric current is increased and a heat produced sufficient to melt the metal of the next higher fusing-point, and this metal is melted and taken out in the same manner. The operation is repeated until all the metals contained in the ore are extracted and separately drawn off.

When it becomes necessary to rotate the pipe S and turn or stir up the ore in the furnace, I loosen the screws $E^3$ and $F^3$ on the conductors E and F and turn the pipe S by turning the wheel $H^3$.

In the reduction of rebellious ores under the claims herein—such, for instance, as iron pyrites—a reducing agent is mixed with the ore when it is subjected to the smelting operation; but the process may be performed with some ores, such as galena, without the use of a reducing agent.

I claim as my invention—

1. The process of separating metal from ore provided with combustible matter which consists in subjecting the ore under exclusion of air to an electric heat below the fusing-point of the metals for driving off the by-products, then admitting a gas containing oxygen thereby causing combustion, and subjecting the ore to the combined heat of combustion and electricity at a temperature above the fusing-point of the metals and causing them to melt and leave the ore.

2. The process of separating metals from ores provided with combustible matter and containing metals of different melting-points, which consists in subjecting the ore under exclusion of air to an electric heat below the fusing-point of the metals for driving off the by-products, then admitting a gas containing oxygen thereby causing combustion, subjecting the ore to the combined heat of electricity and combustion at a temperature above the fusing-point of one metal contained in the ore and maintaining the temperature by regulation of the electric current below the fusing-point of another metal, for melting out the metal of low fusing-point, then increasing the current and raising and maintaining the heat at or above the fusing-point of another metal for melting it out.

3. The process of separating metals from ores containing combustible matter which consists in subjecting the ore to a temperature sufficient to expel the watery vapor contained therein, subjecting the ore under exclusion of air to a higher temperature sufficient to force off metallic particles and fumes contained in the ore, then admitting a gas containing oxygen thereby causing combustion and subjecting the ore to a still higher temperature of a sufficient degree to melt the metallic particles contained in the ore and cause them to leave the ore in a melted state.

4. The process of separating metal from ore which consists in heating the ore by electricity to a heat sufficient to expel the moisture from the ore, increasing the volume of the current and expelling the sulfurous particles under exclusion of air while the heat is at a less degree than is necessary to melt the metal in the ore; and increasing the volume of the current and the heat to a fusing temperature for the metal in the ore and admitting air thereto.

5. The method of separating metals from ores containing combustible matter which consists in subjecting the ore to an electric heating-current under exclusion of air until the fumes and floating particles of metal carried by them are eliminated, then admitting a gas containing oxygen thereby causing combustion, and subjecting it to the combined heat of combustion and electricity for fusing the metal, and then continuing the electric heat under the exclusion of air.

6. The process of separating metal from ore containing impurities, such as sulfur, which consists in subjecting the ore to a variable current of electricity sufficient in volume to desulfurize the ore, then varying and increasing the current in volume and developing a heat thereby sufficient to melt and liquefy the metal contained in the ore, and then decreasing the electric current as the liquid metal is drawn off, thereby maintaining the heat at a proper temperature to correspond with the decreased amount of ore under treatment.

7. In an electric smelting-furnace, the combination of a reducing-chamber for containing the ore, a hollow perforated electric conductor in said reducing-chamber adapted to distribute both electricity and air or gas to the ore in said chamber, means for passing an electric current through said conductor for heating the ore in said chamber, and means for supplying air to said hollow perforated conductor for admission to said chamber.

8. In an electric furnace the combination of a reducing-chamber for containing ore, a hollow perforated electric conductor in said chamber provided with electric and gas distributing wings or projections, means for connecting said conductor with a source of heating electric current for reducing the ore in said reducing-chamber, and means for supplying air or gas to said hollow conductor for admission to said chamber.

9. In an electric furnace the combination of a reducing-chamber for containing ore, a hollow perforated electric conductor in said chamber provided with electric and gas distributing wings or projections, means for connecting said conductor with a source of heating electric current for reducing ore in said reducing-chamber, means for supplying air or gas to said hollow conductor for admission to said chamber, and means for rotating said conductor in said chamber.

10. In an electric smelting-furnace, the combination of a reducing-chamber for containing ore to be melted, a precipitating-chamber for the by-products, a pipe connecting said reducing-chamber with said precipitating-chamber and provided with magnets for arresting magnetic particles of metal, and means for heating said reducing-chamber.

11. In an electric smelting-furnace, the combination of a reducing-chamber for containing ore, a hollow perforated conductor in said chamber, means for connecting said electrode with a source of electric heating-current, and means for admitting air or gas to said electrode for admission to said chamber, and means for controlling the flow of said air or gas.

12. In an electric smelting-furnace, the combination of a reducing-chamber for containing ore, a hollow perforated conductor in said chamber, provided with a hollow perforated spiral wing, means for connecting said electrode with a source of electric heating-current, means for admitting air or gas to said electrode for admission to said chamber, and means for controlling the flow of said air or gas.

13. In an electric smelting-furnace, the combination of a reducing-chamber for containing the ore, a hollow perforated electrical conductor in said chamber, conductors connecting the source of a heating-current with said electrical conductor, means for regulating the electric current passing through said conductor and means for supplying air or gas to said hollow perforated conductor.

In testimony that I claim the invention above set forth I affix my signature in presence of two witnesses.

GEO. D. BURTON.

Witnesses:
E. F. PHILIPSON,
FRED J. HUTCHINSON.